(12) United States Patent
Howe

(10) Patent No.: US 6,678,997 B1
(45) Date of Patent: Jan. 20, 2004

(54) INFLATABLE PLANT SUPPORT STRUCTURE

(75) Inventor: Jeffrey L. Howe, Rte. 4, Box 1372, Quincy, FL (US) 32351

(73) Assignee: Jeffrey L. Howe, Quincy, FL (US)

( * ) Notice: Subject to any disclaimer, the term of this patent is extended or adjusted under 35 U.S.C. 154(b) by 0 days.

(21) Appl. No.: 09/509,705

(22) PCT Filed: Oct. 2, 1998

(86) PCT No.: PCT/CA98/00936
§ 371 (c)(1),
(2), (4) Date: May 26, 2000

(87) PCT Pub. No.: WO99/17603
PCT Pub. Date: Apr. 15, 1999

Related U.S. Application Data
(60) Provisional application No. 60/060,771, filed on Oct. 2, 1997.

(51) Int. Cl.[7] ................................................. A01G 9/02
(52) U.S. Cl. ................. 47/65.5; 47/59 R; 47/65.9; 47/65.8; 441/41; 53/405; 5/710
(58) Field of Search .................. 47/65.5, 59, 32.1, 47/65.8, 65.9, 66.5, 86, 46, 19, 62 R; 5/710; 53/405; 441/41; A01G 9/02

(56) References Cited
U.S. PATENT DOCUMENTS 3,727,345 A * 4/1973 Smith ............................ 47/47
4,291,499 A * 9/1981 Prewer .......................... 47/59
4,679,350 A * 7/1987 Banta ............................ 47/29
5,261,928 A * 11/1993 DeMerritt et al. ............. 47/58
5,311,699 A * 5/1994 Huffman ....................... 47/26
5,620,096 A * 4/1997 Pozzo ........................... 206/450

FOREIGN PATENT DOCUMENTS

| | | | |
|---|---|---|---|
| DE | 29722714 | 3/1998 | |
| EP | 0027697 | * 4/1981 | ........ A01G/31/02 |
| EP | 0426549 | 5/1991 | |
| EP | 0724827 | 8/1996 | |
| FR | 2584890 | 1/1987 | |
| WO | 9400365 | 1/1994 | |

* cited by examiner

Primary Examiner—Peter M. Poon
Assistant Examiner—Andrea Valenti
(74) Attorney, Agent, or Firm—Webb Ziesenheim Logsdon Orkin & Hanson, P.C.

(57) ABSTRACT

An inflatable plant support system for receiving, moving and growing potted plants. The system includes an elongated inflatable member having recesses defined in a top surface thereof to accept potted plants. Channels defined in the top surface distribute water to the plants. The inflatable member may be rolled onto a reel and inflated as it is unrolled so that plants may be placed thereon. An interior of the inflatable member is heated.

15 Claims, 3 Drawing Sheets

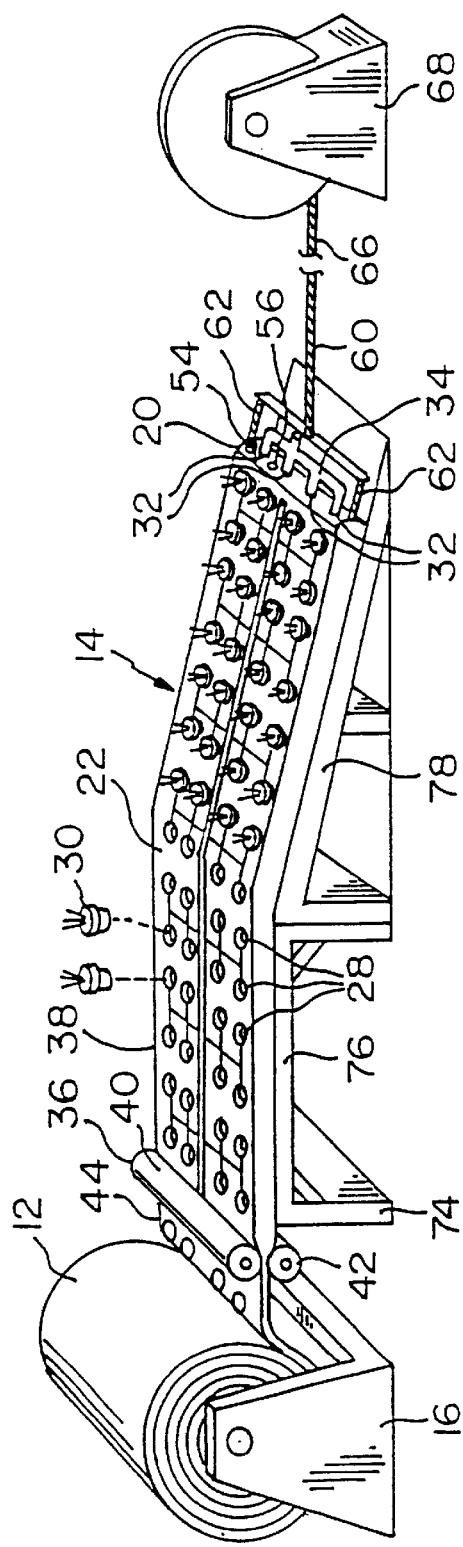
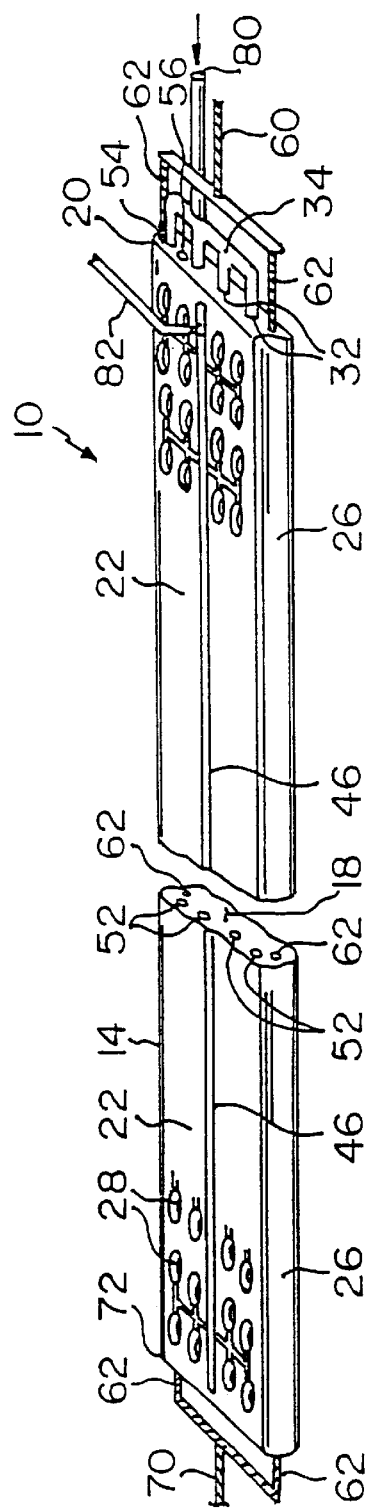
FIG. 1
FIG. 2

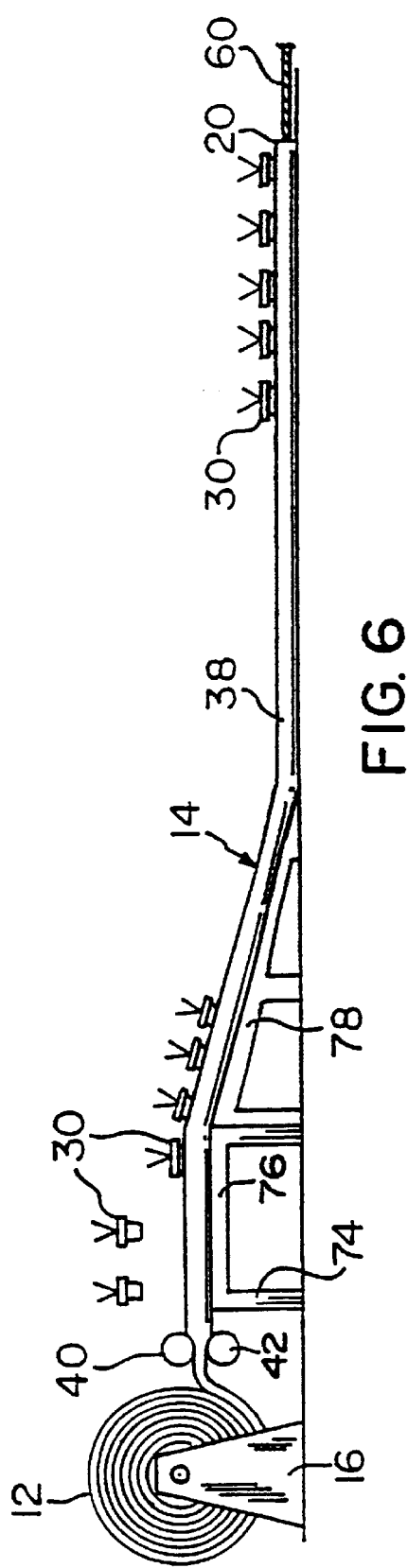
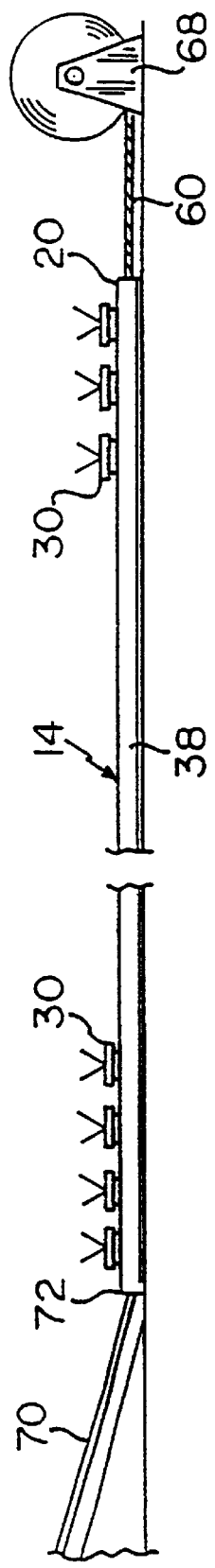

INFLATABLE PLANT SUPPORT STRUCTURE

CROSS-REFERENCE TO RELATED APPLICATION

This application claims priority from earlier filed United States Provisional Patent Application Serial No. 60/060,771, filed Oct. 2, 1997, and entitled "Inflatable Plant Support Structure," now abandoned.

BACKGROUND OF THE INVENTION

1. Field of the Invention

The present invention relates to support systems for plants, more particularly to an inflatable plant support structure.

2. Prior Art

Potted plants are typically grown in environmentally controlled greenhouses. The air temperature and humidity are controlled throughout the entire volume of the greenhouse. Water is delivered to each of the plants in a system of water delivery pipes and sprinkler heads.

Such greenhouses may be up to 1,000 feet wide and 120 feet long with the width of the greenhouse divided up into individual bays of ten to twenty feet in width. Roadways extending the full width of the greenhouse on either end of the greenhouse and/or through the middle of the greenhouse provide access to the bays for transporting plants to and from the bays. Once the plants have been transported to the end of the bays, a worker must remove each potted plant from a truck or dolly or the like and carry the plant down the bay and place it on the floor or a table. Such procedures are very time consuming and labor intensive as workers walk back and forth carrying potted plants from a truck to the floor of the bay. When the plants have grown sufficiently, workers must again pick up each of the individual plants, remove them from the bay and reload them onto a truck for delivery elsewhere.

One solution to this problem has been the use of a conveyor for transporting the plants from the truck to the bay, but such conveyors are cumbersome and expensive to maintain. Another solution has been the use of a Dutch tray and a railway. The Dutch tray typically is a 4 foot by 9 foot table having casters mounted on its underside which allow the tray to be moved down the bay along the railway. This requires that the roadway also have rails and results in a very expensive installation, typically $10 per square foot. Considering that the cost of operating a greenhouse is about $10 per square foot itself, the use of a Dutch tray doubles the cost of operation of a greenhouse and therefore is prohibitively expensive.

Thus, a need remains for a plant support and transport system which reduces the labor required for placing potted plants within bays of a greenhouse.

SUMMARY OF THE INVENTION

This need is met by the inflatable plant support structure of the present invention which includes an elongated inflatable housing, preferably formed in a roll made from polyethylene. The housing defines a chamber and includes a plant receiving surface outside of the chamber. A plurality of recesses are defined in the plant receiving surface and are each adapted to receive a potted plant. A first end of the inflatable housing defines one or more first inlets, a second inlet and an outlet. The first inlets are connected to a manifold having a plurality of pipes, each pipe being connected to one of the first inlets. The manifold is adapted to be in fluid communication with a first fluid source, preferably pressurized air, so that the chamber may be filled with the first fluid.

A plurality of channels are defined in the plant receiving surface and include a main channel and a plurality of branch channels in fluid communication with the main channel and the recesses. A duct is disposed within the chamber and is in fluid communication with the second inlet and the outlet. The second inlet is adapted to be in fluid communication with a second fluid supply and the outlet communicates with the atmosphere. Heat from the second fluid in the duct transfers to the first fluid in the chamber. A plurality of apertures are defined in the plant receiving surface to allow the heated first fluid to escape therethrough.

A first cable is attached to the first end and is adapted to be wound upon a first cable reel. A second cable is attached to the second end and is adapted to be wound onto a second reel. When the first cable is wound upon the first cable reel, the roll and the second cable unwind from the second reel and the roll is unwound to expose the plant receiving surface.

The present invention further includes a plant support system including the plant support structure and a body which extends over the housing and compresses the plant receiving surface and the base together so that only the portion of the housing between the body and the first end is inflated when the first fluid enters the housing through the first inlets. The system further includes a support member which elevates the inflated portion adjacent the body. The support member includes an inclined surface over which the inflated portion moves when the roll is unwound and the first cable is wound onto the first cable reel.

BRIEF DESCRIPTION OF THE DRAWINGS

FIG. 1 is a top perspective view of an inflatable plant support system with an inflatable plant support structure made in accordance with the present invention when partially unrolled;

FIG. 2 is a side perspective view of the inflatable plant support structure illustrated in FIG. 1 when fully unrolled;

FIG. 6 is a side elevation view of the inflatable plant support structure illustrated in FIG. 1 when partially unrolled; and FIG. 7 is a side elevation view of the inflatable plant support structure illustrated in FIG. 6 when fully unwound.

DETAILED DESCRIPTION OF THE PREFERRED EMBODIMENTS

Figure 3:
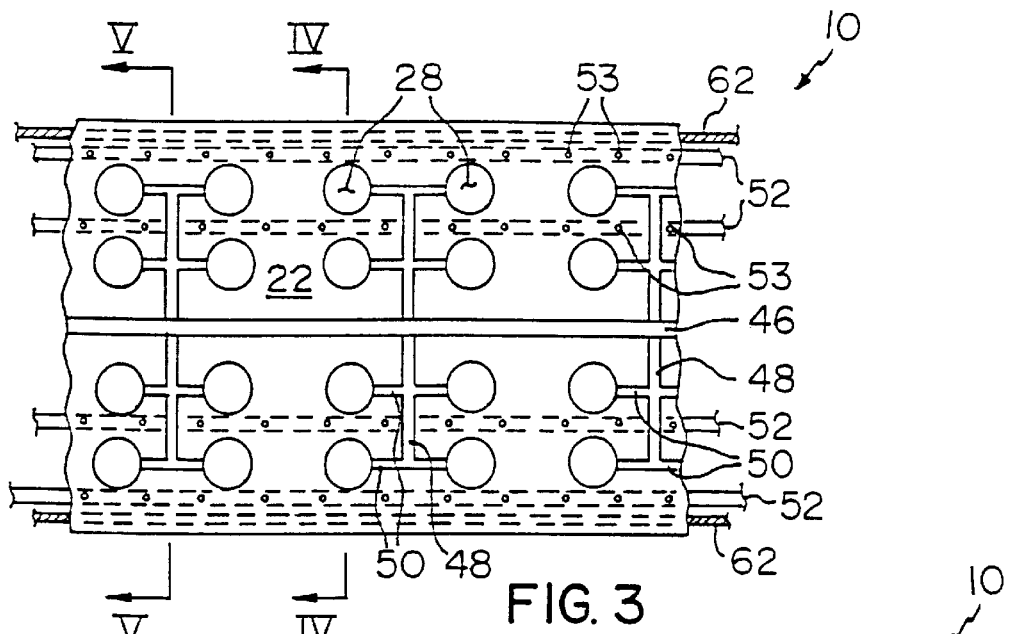
FIG. 3 is a plan view of a portion of the inflatable plant support structure illustrated in FIG. 1.

As depicted in FIGS. 1 and 2, the inflatable plant support structure 10 of the present invention includes a roll 12 of an elongated inflatable housing 14. The roll 12 is adapted to be wound onto a housing reel 16. The housing 14 defines a chamber 18 and includes a first end 20 extending from the roll 12. As the roll 12 is unwound, a plant receiving surface 22 is exposed which is spaced apart from a base 24 by two sides 26.

Figure 4:
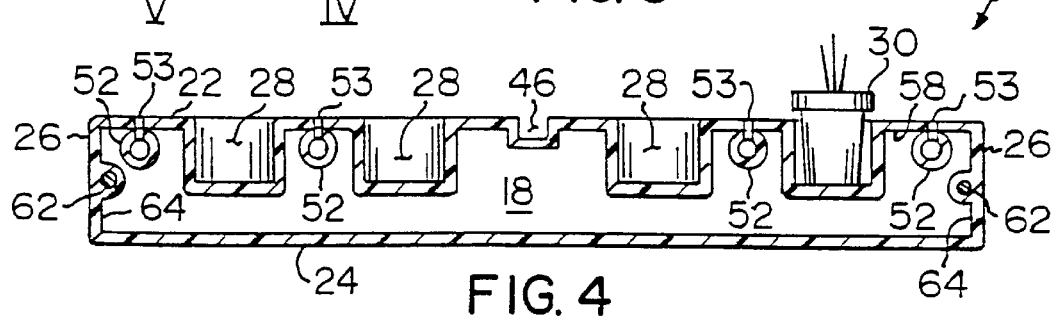
FIG. 4 is a cross sectional view of the inflatable plant support illustrated in FIG. 3 taken along line IV—IV.

As shown in detail in FIGS. 3 and 4, the plant receiving surface 22 defines a plurality of recesses 28, preferably being cylindrically or frustoconically shaped, which are each adapted to receive a potted plant 30. For six inch pots, such as may be used to grow annual plants, the centers of the recesses 28 should be about seven inches apart. The housing 14 is made of a flexible material such as polyethylene which allows it to be wound into the roll 12 and unwound to expose the plant receiving surface 22.

Referring back to FIGS. 1 and 2, a plurality of first inlets 32 are defined in the first end 20 and are in fluid communication with the chamber 18. The first inlets 32 are adapted to be in fluid communication with a fluid source (not shown), preferably an air supply such as an air compressor. Air provided from the air supply inflates the housing 14. Preferably, each of the first inlets 32 are connected to the air supply via a manifold 34. The air supply tubing and the first end 20 further define a bleed hole (not shown) having a removable plug (not shown).

A body 36 extends across-a width of the housing 14 urging the plant receiving surface 22 and the base 24 towards one another such that only a portion 38 of the housing 14 extending between the body 36 and the first end 20 is inflated when the roll 12 is unwound and air flows through the manifold 34, the first inlets 32 and into the chamber 18. Preferably, the body 36 includes an upper roller 40 impinging upon the plant receiving surface 22 and a lower roller 42 impinging upon the base 24. The gap between surfaces of the rollers 40 and 42 is selected to allow the housing 14 to pass between the rollers 40 and 42 yet prevent air from passing between the rollers 40 and 42 into an uninflated portion 44 of the housing 14.

As shown in FIG. 3, the plant receiving surface 22 defines a main channel 46, a plurality of first branch channels 48 and a plurality of second branch channels 50. The main channel 46 extends along the length of the housing 14 and the first branch channels 48 are in fluid communication with the main channel 46. The first branch channels 48, in turn, are in fluid communication with the second branch channels 50 which are in fluid communication with the recesses 28. Preferably, the first branch channels 48 have larger cross sectional areas than the second branch channels 50. Other configurations of the channels can be made without departing from the invention.

Figure 5:
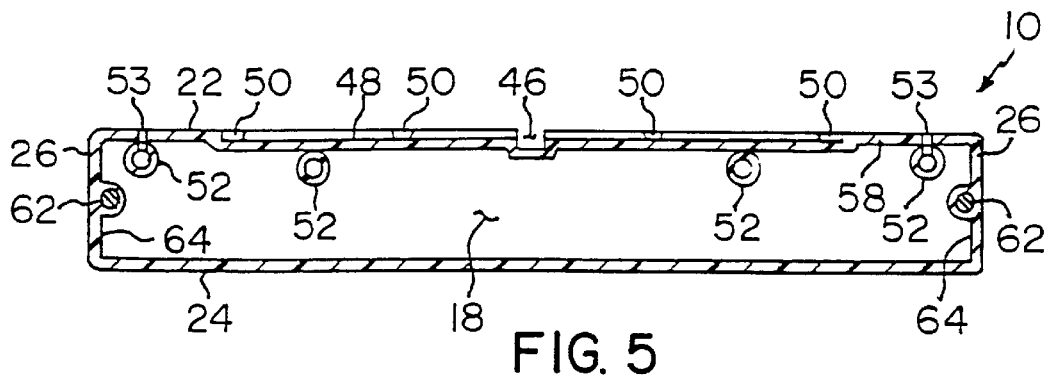
FIG. 5 is a cross sectional view of the inflatable plant support structure illustrated in FIG. 3 taken along line V—V.

FIGS. 4 and 5 show a heating duct 52 disposed within the chamber 18 to warm the air within the chamber 18 and maintain the proper temperature for the potted plants 30 growing within the recesses 28. The heating duct 52 is in fluid communication with a second inlet 54 defined in the first end 20 and which is adapted to be connected to a warm fluid supply (not shown). The housing 14 further includes an outlet 56 in fluid communication with the heating duct 52 and adapted to vent to the atmosphere. The heating duct 52 preferably is disposed within the chamber 18 adjacent an underside 58 of the plant receiving surface 22 in a sinuous manner to ensure heat transfer throughout the chamber 18 from the heating duct 52 to the chamber 18. A plurality of apertures 53 are defined in the plant receiving surface 22, preferably located above the heating duct 52.

Returning to FIGS. 1 and 2, a first cable 60 is attached at one end thereof to the first end 20. Preferably, the first cable 60 includes two portions 62 which extend through the housing 14 and are each mounted on an inner surface 64 of one of the sides 26. The portions 62 are longer than the housing 14. Another end of the first cable 60 is attached to a cable reel 68. A second cable 70 is attached to the first cable portions 62 extending out from a second end 72 of the housing 14 and is attached to the housing reel 16.

A table 74, having a horizontal surface 76 and a sloped surface 78, is positioned adjacent the housing reel 16. The sloped surface 78 preferably forms an angle of about 25° with the floor.

In operation, the first end 20 of the housing 14 is withdrawn from the roll 12 by winding the first cable 60 around the cable reel 68. Compressed air is supplied to the manifold 34 via an air supply tubing 80 connected to the air supply. The air supply tubing 80 is provided on a tubing reel (not shown), or the cable reel 68 and the tubing reel may be combined as a single unit. The air flows through the air tubing 80, the manifold 34 and into the chamber 18 via the inlets 32. The portion 38 of the housing 14 extending between the rollers 40 and 42 and the first end 20 becomes inflated. The roll 12 is slowly unwound and the housing 14 is pulled along the length of a bay by the first cable 60. Potted plants 30 are inserted into the recesses 28 of the inflated portion 38 which rests on the horizontal surface 76 of the table 74.

As shown in FIGS. 6 and 7, when the first end 20 is pulled via the first cable 60 towards the cable reel 68, a portion of the plant receiving surface 22 having potted plants 30 placed in the recesses 28 moves off the horizontal surface 76 and down the sloped surface 78 to the floor. When the housing 14 is fully extended and unwound from the housing reel (FIG. 7), the housing 14 and the potted plants 30 placed therein remain in this position for a period of time. Due to the apertures 53 and possible incidental air leaks in the housing 14, air is preferably continuously supplied from the air supply to the chamber 18 so that the housing 14 remains inflated.

A source of warm fluid, preferably warm air, is connected to the second inlet 54 so that air circulates through the heating duct 52. The warm air becomes cooled as it passes through the heating duct 52 as heat transfers from the warm air inside the heating duct 52 to the air within the chamber 18 and to the potted plants 30. The cooled air then exits the heating duct 52 via the outlet 56 to the atmosphere. Warm air escapes the chamber 18 through the apertures 53 to warm the potted plants 30. The temperature of the warm air is selected to provide the proper growing temperature for the plants 30.

When the housing 14 is fully extended and rests upon the floor, the main channel 46 may be filled with water from a hose 82 or the like as shown in FIG. 2. As water fills the main channel 46, it flows into the first branch channels 48, the second branch channels 50 and into the recesses 28. The channels 46, 48 and 50 are filled with water periodically or as needed for growth of the plants.

When the growing period of the plants has ended and the plants are ready to be removed from the bay, the second cable 70 and the housing 14 are rewound into the roll 12. In order to rewind the housing 14 onto the housing reel 16, the housing 14 must be deflated. The removable plug is removed from the bleed hole and air slowly escapes therethrough to the atmosphere. The pair of rollers 40 and 42 urges the plant receiving surface 22 and the base 24 towards each other thus reducing the volume of the chamber 18 and forcing air out of the chamber 18 through the bleed hole. As the housing 14 is rewound onto the housing reel 16, the potted plants 30 travel back up the sloped surface 78 of the table 74 to the horizontal surface 76. The potted plants 30 may readily be removed from the recesses 28 supported by the horizontal surface 76 and be placed onto a truck or the like for transport elsewhere.

The inflatable plant support structure 10 may further include a cover (not shown) releasably attached to the plant receiving surface 22 or the sides 26 to define an upper chamber into which the plants 30 extend thus creating a self-contained greenhouse. The upper chamber is climate controlled such that the combination of the inflatable support structure with the cover may be used as a self-contained greenhouse. The cover includes an inlet for delivery of water and is transparent or translucent to permit sunlight to reach the plants. Each self-contained greenhouse may be operated independently. Plants requiring common temperature control and watering level may be placed together in one greenhouse. The cover is reattachable to the plant receiving surface 22 or the sides 26 by use of a sealing mechanism such as a zipper or adhesives. The sealing mechanism permits the cover to be opened for placement of plants 30 into the recesses 28 and reopened for removal of plants 30 and then reopened and resealed repeatedly.

The cover defines a cover inlet and a cover outlet. The cover inlet is adapted to receive a flow of air, preferably heated air, to inflate the cover above the plants 30 as the inflatable plant support structure 10 is unrolled and while the plants 30 are growing. The cover outlet is adapted to allow air to escape the upper chamber when the inflatable plant support structure 10 is unrolled or as otherwise needed to provide air flow through the upper chamber to refresh the air within the upper chamber.

In order to maintain the cover inflated above the plants 30 when the plants 30 are being placed into or removed from the recesses 28, the air supplied to the upper chamber through the cover inlet is pressurized. Alternatively, the area surrounding an opened portion of the cover may be contained with a pressurized chamber in sealing engagement with the inflatable plant support structure 10 and/or the cover.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A plant support structure comprising:
   an inflatable member defining a chamber and having a plant support surface on the outside surface of said chamber, said plant support surface defining a plurality of recesses, each said recess adapted to receive a growing plant, wherein said inflatable member includes a first end defining a first inlet for receiving a first fluid to inflate said inflatable member, a second inlet and an outlet; and
   a duct received within said chamber and in fluid communication with said second inlet and said outlet, wherein a second fluid is flowable through said second inlet and said duct and out through said outlet to transfer heat between a second fluid in said duct and a first fluid in said chamber.

2. The structure as claimed in claim 1 wherein said plant support surface further defines a plurality of channels in fluid communication with said recesses.

3. The structure as claimed in claim 2 wherein said channels include a main channel and a plurality of branch channels in fluid communication with said main channel and said recesses.

4. The structure as claimed in claim 1 wherein said inflatable member is made from polyethylene.

5. The structure as claimed in claim 1 wherein said plant receiving surface defines a plurality of apertures such that a first fluid within said chamber may at least partially escape said chamber through said apertures.

6. The structure as claimed in claim 5 wherein said plurality of channels includes a main channel and a plurality of branch channels in fluid communication with said main channel and said plurality of recesses.

7. The structure as claimed in claim 1 wherein said first end defines a plurality of first inlets, said structure further comprising a manifold having a plurality of pipes, each said pipe connected to one of said inlets.

8. A plant support structure comprising an inflatable member defining a chamber and having a plant support surface outside of said chamber, said plant support surface defining a plurality of recesses, each of said plurality of recesses adapted to receive a growing plant, said plant support surface further defining a plurality of channels that each receives and holds a liquid, said inflatable member comprises a first end defining a first inlet for receiving a first fluid to inflate an inflatable portion, wherein said first end further defines a second inlet and an outlet and said inflatable member further comprises a duct received within said chamber and in fluid communication with said second inlet and said outlet, and wherein a second fluid is flowable through said second inlet and said duct and out through said outlet to transfer heat between a second fluid in said duct and a first fluid in said chamber,
   wherein at least one of said plurality of channels that receives and holds a liquid is in fluid communication with two or more of said plurality of recesses.

9. A plant support system comprising an inflatable member defining a chamber and having a plant support structure outside of said chamber, said plant support surface defining a plurality of recesses, each of said plurality of recesses adapted to receive a growing plant, said plant support surface further defining a plurality of channels that each receives and holds a liquid, wherein at least one of said plurality of channels that receives and holds a liquid is in fluid communication with at least two of said plurality of recesses; and
   a body adapted to compress said inflatable member and maintain one portion of said inflatable member inflated and another portion of said inflatable member uninflated, said inflatable member comprises a first end defining a first inlet for receiving a first fluid to inflate said inflatable portion, and wherein said first end further defines a second inlet and an outlet and said inflatable member further comprises a duct received within said chamber and in fluid communication with said second inlet and said outlet, wherein a second fluid is flowable through said second inlet and said duct and out through said outlet to transfer heat between a second fluid in said duct and a first fluid in said chamber.

10. The system as claimed in claim 9 further comprising a support member adapted to elevate said inflated portion adjacent said body, said support member including an inclined surface, wherein when said inflatable member is moved past said body, a portion of said inflatable member inflates and passes downwardly over said inclined surface.

11. The system as claimed in claim 9 wherein said uninflated portion of said inflatable member is adapted to be wound into a roll.

12. The system as claimed in claim 9 further comprising a first cable fixed to said first end of said inflatable member and a second cable fixed to a second end of said inflatable member, said first and second cables each being adapted to be wound onto a respective first reel and second reel.

13. The system as claimed in claim 9 wherein said inflatable member is made from polyethylene.

14. A plant support structure comprising an inflatable member defining a chamber and having a plant support surface outside of said chamber, said plant support surface defining a plurality of recesses, each of said plurality of recesses adapted to receive a growing plant, said plant support surface defining a plurality of channels that each receive and hold a liquid, wherein at least one of said plurality of channels that receive and hold a liquid is in fluid communication with two or more of said plurality of recesses, and further comprising a body adapted to compress said inflatable member and maintain one portion of said inflatable member inflated and another portion of said inflatable member uninflated and a support member adapted to elevate said inflated portion adjacent said body, said support member including an inclined surface, whereby said inflatable member inflates and passes downwardly over said inclined surface.

15. A plant support system comprising an inflatable member defining a chamber and having a plant support structure outside of said chamber, said plant support structure defining a plurality of recesses, each said recess adapted to receive a growing plant; and a body adapted to compress said inflatable member and maintain one portion of said inflatable member inflated and another portion of said inflatable member uninflated, wherein said uninflated portion of said inflatable member is adapted to be wound into a roll.

* * * * *